United States Patent Office 2,724,448
Patented Nov. 22, 1955

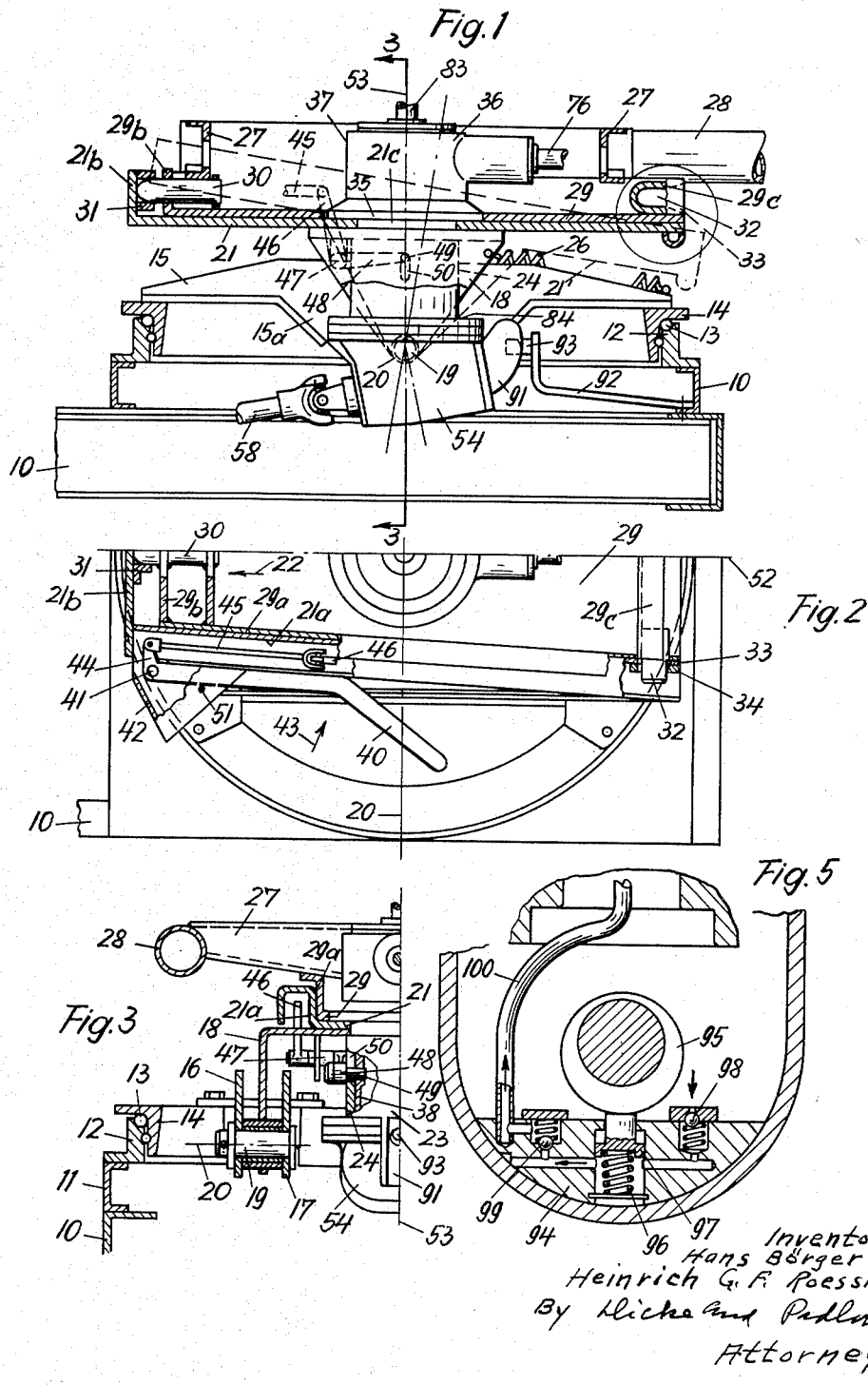

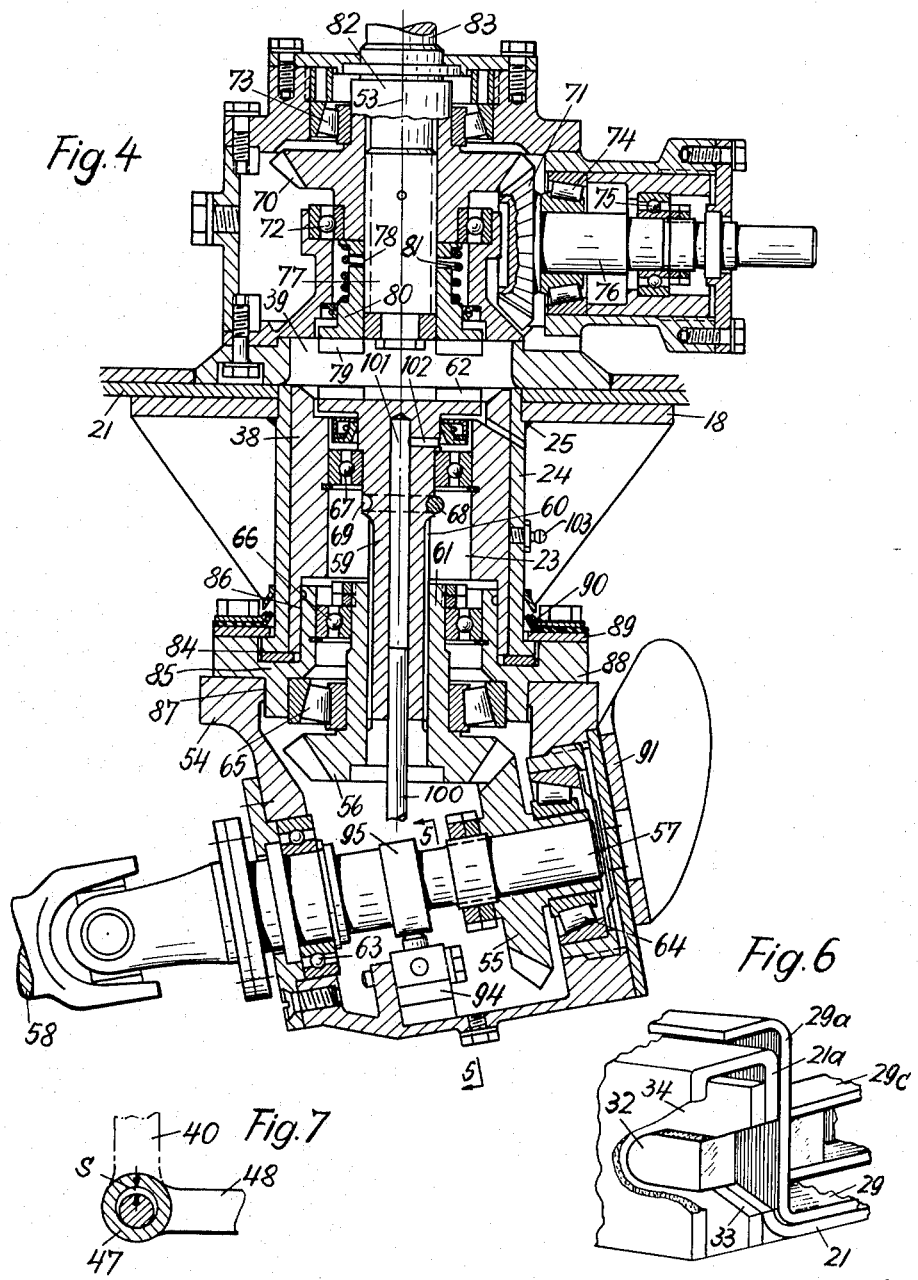

2,724,448

TRACTOR-TRAILER COUPLING DEVICE WITH POWER TRANSMISSION MEANS THEREIN

Heinrich G. F. Rössler and Hans Börger, Gaggenau (Baden), Germany, assignors to Daimler-Benz Aktiengesellschaft, Stuttgart-Unterturkheim, Germany Application March 3, 1953, Serial No. 340,068

7 Claims. (Cl. 180—14)

The present invention relates to a coupling device for coupling a trailer to a tractor. More particularly, the present invention relates to a coupling device of the so-called "fifth-wheel" type for coupling a motor vehicle or truck to a semi-trailer which is preferably provided with a device for transmitting the drive or a power transmission from the tractor to the trailer.

Accordingly, it is an object of the present invention to provide primarily an arrangement which effects the transmission of a favorable stabilizing moment from the tractor to the trailer when the latter gets into a tilting position on rugged ground, particularly also when the longitudinal axis of the tractor assumes about a right angle with the longitudinal axis of the trailer.

Another object of the present invention resides in the particular construction of the hinge joint between the tractor and the trailer, wherein the working point of the load at the tractor may be arranged relatively low near the upper surface of the tractor frame without impairing the mounting and the unobjectionable operation of the device housed in the clutch for the transmission of power.

Another object of the present inveention is to construct the device for transmitting power so that no intermediate joints are required therein any longer.

The present invention relates particularly to semi-trailer truck couplings which are pivotally mounted about a horizontal transverse axis and which are rotatably supported about a vertical axis in or at a revolving rim arranged at the tractor, the joint of the coupling lying above the horizontal swinging axis or above the revolving rim, and the couplings being provided with a device arranged therein for transmitting power from the tractor to the trailer. A particular feature of the present invention consists in that the coupling as a whole is pivotal about the horizontal transverse axis and that in the section of the coupling connected to the tractor and in the section of the coupling connected to the trailer, each of which section is non-rotatably connected with the corresponding vehicle with respect to the longitudinal axes of the vehicles, are also non-rotatably connected to each other during a coupled condition.

According to a further feature of the present invention, the lower section which receives the driving shaft is rotatable about the vertical axis of the coupling with respect to the upper section thereof, the upper section being non-rotatably connected with the trailer about a vertical axis and pivotal about the horizontal transverse axis with respect to the tractor. In that case, the swiveling movement of the device for transmitting power can be compensated by the drive shaft which may be constructed as a Cardan shaft.

In an embodiment in accordance with the present invention, the non-rotatable connection of the two coupling sections is established by providing the tractor-connected section of the coupling with a shoe, which tapers in the direction of motion and has preferably a trapezoidal ground plan at the joint of the coupling, and by providing the trailer-connected section with a foot or foot-like member which is correspondingly tapered and inflexibly connected with the trailer. When saddling or connecting the trailer on the tractor the foot-like member is pushed in the shoe up to the stopping face thereof so that the two parts are prevented from rotating relative to each other. After being pushed in, the foot is locked by a pin introduced from the lower side of the shoe.

Other features and advantages of the present invention will become more obvious from the following description when taken in connection with the accompanying drawing which shows for purposes of illustration only one preferred embodiment of the present invention, and wherein:

Figure 1 is a longitudinal sectional view through a semi-trailer coupling in accordance with the present invention wherein the device for transmitting power arranged within the coupling is illustrated in side view.

Figure 2 is a plan view of the coupling as viewed from the top thereof.

Figure 3 is a partial cross sectional view taken along line 3—3 of Figure 1.

Figure 4 is a vertical longitudinal sectional view on a larger scale through the device for transmitting power.

Figure 5 is a partial sectional view taken along lines 5—5 of Figure 4.

Figure 6 is an enlarged perspective view of the section of the coupling indicated by the circle in Figure 1 thereof, and Figure 7 is a cross sectional view showing the support of a lever which operates the coupling.

Referring now to the drawing, wherein like reference numerals are used throughout the various views to designate like parts, and more particularly to Figure 1, reference numeral 10 designates the rear end of the frame 10 of the tractor. The outer ring 12 of a revolving rim is fastened to the rear end of the frame 10 by means of intermediate girders 11. The inner ring 14 of the revolving rim which constitutes an intermediate coupling plate or member and which is suitably journalled on balls 13, carries two transverse members 15 arranged parallel to each other at some distance, each of the transverse members 15 extending with the middle section 15a thereof downwardly into the ring. The middle section 15a has two high webs 16, 17 at and between which a member 18 having a yoke-like cross section (Figure 3) is pivotally mounted about a horizontal transverse axis 20 (Figure 1) by means of pins 19. The yoke-like member 18 carries a first coupling member or lower coupling plate 21 which is constructed as a shoe-like member tightly connected therewith and which has a trapezoidal ground plan tapering in the direction of motion, as indicated by arrow 22.

In front and at its sides the shoe is provided with guiding and stopping webs 21a, 21b, and in its center with a circular opening 21c, which is also provided in the yokelike member 18 solidly connected with the shoe. This opening 21c serves to receive the tractor-connected section 23 of the device for transmitting power from the tractor to the trailer. The cylindrical casing 24 of the section 23 is welded on the yoke at 25 (Figure 4). If no trailer is saddled on the tractor, the shoe 21 is swung about the transverse axis 20 into the preliminary position 21', shown in Figure 1 in dotted lines, by means of a spring 26 hooked into the yoke 18. In this position 21' the shoe forms an inclined approach surface for the upper coupling plate 29 which is rigidly attached to the frame 28 of the trailer by means of the transverse member 27 when saddling the trailer on the tractor. The upper coupling plate 29 thereby constitutes a second coupling member.

The upper coupling plate 29 which is designed as a foot-like member also has a ground plan of a trapezoidal form fitting exactly into the shoe 21, and is also provided with upwardly directed webs 29a at its side edges. These webs 29a serve to guide the foot 29 at the webs 21a of the shoe 21. At the front transverse web 29b of the foot there is a guiding and stopping pin 30 (Figures 1 and 2) with a hemispherical face arranged in the longitudinal center plane of the coupling plate. Near the end of the saddling movement of the trailer the pin 30 slides into a cylindrical sleeve 31 welded on the transverse web 21b of the shoe 21 and is stopped by the web 21b so that the exact position of the foot 29 is guaranteed within the shoe 21. Moreover, by the particular arrangement of the pin 30 along with the rear lateral projections 32 of the foot 29 the trailer saddled on the tractor is prevented from being lifted. The projections 32 on both sides are embodied by pins with semi-cylindrical faces which are welded in the two ends of a correspondingly shaped transverse girder 29c of the foot 29 and which slide into slots 33 of the lateral webs 21a of the shoe 21, the webs 21a being strengthened near the slots 33 (Fig. 6).

The casing 37 of the trailer-connected section 36 of the device for transmitting power is welded to the foot 29 in the center opening 35 thereof. As soon as the foot 29 has taken the correct position in the shoe 21 after the trailer is saddled on the tractor, a definite coupling is effected in a well known way by shifting the coupling pin or sleeve 38 in the casing section 24 to the top, the pin 38 entering the bore 39 of the casing section 37 and thus preventing a horizontal sliding of the foot 29 out of the shoe 21. In this way the tractor-connected section of the coupling and the trailer-connected section are secured against an unintentional disconnecting. The advance of the pin 38 is effected by swinging the hand lever 40 supported at 41 in a lug 42 of the shoe 21 in the direction of the arrow 43 up to the position illustrated in Fig. 2. By means of a connecting rod 45 the second end 44 of the hand lever is linked with the end 46 of a bellcrank-lever which is slewably bedded at the yoke 18 at 47 and whose second end 48 is provided with a pin 49 engaging the coupling pin 38 through a slot 50 of the casing 24. The hand lever 40 is secured by a cotter 51 in the illustrated position of Figure 2. In order to allow the free end of the lever arm 48 with the pin 49 to follow the linear movement defined by the slot 50, the rotating pin 47 of the bellcrank-lever 46, 48 is supported in the yoke 18 with a corresponding radial play s (Fig. 7).

Owing to the described design and suspension of the trailer-connected shoe 21 and of the trailer-connected foot 29 the coupling is able to take up tilting moments exerted by the trailer about its longitudinal axis 52 (Figure 2) at a relatively large distance from this longitudinal axis, and to transmit them to the frame of the tractor by way of the pins 19 and the revolving rim 12, 14. Thus the weight of the tractor is utilized for compensating such tilting moments in all the swinging positions of the trailer in relation to the tractor, as the horizontal axis 20 rotates along with the trailer by the revolving rim 12, 14 about the vertical axis 53 of the coupling, for instance, during the turning of the tractor-trailer train, and thus the pivots 19 of the coupling are always directed transverse to the longitudinal axis 52 of the trailer. Moreover, owing to the described construction of the coupling there will in its interior be sufficient space for installing a device for transmitting power from the tractor to the trailer, which will be described hereinafter in detail with reference to the embodiment illustrated in Fig. 4.

In the bottom casing section 54 (Figure 4) of the section 23 of the device belonging to the tractor, a bellcrank bevel drive is arranged consisting of the bevel gears 55, 56. The shaft 57 of the bevel gear 55 is driven by a Cardan shaft 58 from the driving engine of the tractor by way of a cut-off coupling not illustrated here. The shaft 59 of the bevel gear 56 is connected longitudinally shiftable but non-rotatable with the wheel hub 61 by way of its multi-splined section 60 and provided at its top end with coupling dogs 62. The bevel gears or their shafts are journalled in anti-friction bearings easily rotatable in the casing section 54 at 63, 64, 65, 66, and the top section of the shaft 59, moreover, at 67 in the coupling pin 38 in a manner so as to be axially shiftable in the casing section 24, as described above. A cross pin 68 firmly arranged in the coupling pin 38 for movement therewith engages a ring groove 69 of the shaft 59 so that the latter can rotate freely in the coupling pin 38, but must automatically follow its axial movement.

In the casing 37 of the section 36 of the device belonging to the trailer a couple of bevel gears 70, 71 are also journalled in anti-friction bearings 72, 73, 74, 75 so as to be easily rotatable. The shaft 76 of the wheel 71 represents the horizontal tapping shaft of the device, by means of which any accessories disposed on the trailer, such as pumps, conveying installations, etc. can be driven. The Shaft 77 of the wheel 70 projects downward out of its hub. On the multi-splined section 78 of the projecting shaft section a sleeve 80 provided with coupling dogs 79 is arranged longitudinally shiftable against the action of a spring, but non-rotatable with respect thereto.

When the hollow coupling pin 38 is pushed into the bore 39 of the coupling section firmly connected with the trailer by means of the lever 40, the coupling pin 68 takes the shaft 59 to the top so that the coupling dogs 62 engage the dogs 79 of the sleeve 80. If this is not at once feasible, because the dogs 62 and 79 are not in a suitable position, the shaft 59 first shifts the sleeve 80 on the shaft 77 a little upwardly against the action of the spring 81. Due to the action of the spring 81 the dogs 62, 79 engage immediately after the shaft 59 begins to rotate with the engagement of the power transmission. At all events the members of the device for transmitting power from the tractor to the trailer are also automatically coupled simultaneously at the coupling of the trailer to the tractor, and also automatically uncoupled when the trailer disengages from the tractor.

Since the device for transmitting power swings as a rigid whole when the trailer swings about the transverse axis 20, no joints are necessary either at the driving shaft 76 or in the interior of the device. All the swinging movements about the transverse axis are solely compensated by the Cardan shaft 58 required in the tractor anyhow. Therefore, if the position of the auxiliary machine to be driven on the trailer is favorable or several auxiliary machines must be driven simultaneously, a second tapping shaft 83 for instance a floating shaft 83 easily removable at any time, can be unhesitatingly inserted into the hub 82 of the bevel wheel 70.

Different considerations arise in connection with swinging movements of the trailer about the vertical axis 53 (Figure 1) which can often amount to an angle of 90°, for instance, during turning of the tractor-trailer train, so that they cannot any longer be compensated at the Cardan shaft 58. Therefore, the casing of the tractor-connected section of the device for transmitting power is subdivided at 84, and the lower casing section 54 is suspended at the upper section 24 for relative rotating movement with respect thereto about the vertical axis 53. In order to assure nevertheless an unobjectionable working of the bevel gears 56, 57, the lower casing section 54 is suspended by means of a centering flanged sleeve 85 (Figure 4), whose cylindrical positioning surfaces tightly fit at 86 in the coupling pin 38 and at 87 in the lower casing section 54. The sleeve 85 is rigidly fastened with its flange 88 at the casing section 54 and floatingly suspended from the upper casing section 24 by means of a holding ring 89. A flexible packing ring 90 prevents the bearing assembly from being impaired by dirt, water and the like. In a vertical plane passing through the longitudinal axis 52 of the tractor there is provided at the rear end of the lower casing section 54 a guiding member 91 (Figures 1, 3 and 4) having a U- shaped ground plan. A roll 93 which is rotatably supported by means of the bracket arm 92 at the tractor on a level with the transverse axis 20 extends into the guiding member 91 with some lateral play. Thus the lower casing section 54 along with the other members 24, 37 of the casing can freely swing about the transverse axis 20, but it is prevented by the roll 93 in any swinging position from rotating about the vertical axis 53 in relation to the tractor. Consequently, the Cardan shaft 58 can dispense with such rotatory motions which are compensated by a relative rotation between the casing section 24 and 54 at 84 and by a corresponding rotation to one another of the shafts 57, 76.

The lubricating of the trailer-connected section of the device for transmitting power is effected by an oil pump 94 (Figure 5) in the lower casing section 54. The plunger 97 of this pump is reciprocated by the action of a cam 95 of the drive shaft 57 and of a spring 96, and draws in the lubricating oil collected in the lower casing section by way of a return valve 98 and forces it by way of a relief valve 99 through a line 100 from which it flows through a longitudinal bore 101 and a transverse bore 102 in the shaft 59 and reaches into the interior of the coupling pin 38 above the bearings 67, 66, 65 so as to flow back into the oil sump by way of the bevel wheels 55, 56, whereas the gliding surface of the coupling pin 38 in the casing 24 is lubricated with grease by means of the nipple 103.

The invention is not restricted to the illustrated example of design, but it can at will be varied in the scope of the singular features of the invention.

What we claim is:

1. A coupling device for coupling a trailer to a tractor, comprising supporting means at the tractor, a coupling plate rotatably supported on said supporting means about a vertical axis, a first coupling member rotatably supported on said coupling plate about a horizontal axis, a second coupling member connected with said trailer, means for coupling together said coupling members, drive means on said tractor, drive means on said trailer, and means for coupling together said two drive means within said coupling members, said first-mentioned coupling means including an opening provided in said second coupling member and a vertically adjustable coupling sleeve in said first coupling member, said sleeve moving into said opening during vertical adjustment thereof and thereby interlocking said two coupling members, said second-mentioned coupling means including a first shaft member coaxially mounted in said sleeve and connected thereto for common axial movement therewith, clutch means on said first shaft member, a second shaft member in said second coupling member coaxial with said first shaft member, and clutch means on said second shaft member for engagement with said first-mentioned clutch means during axial adjustment of said sleeve.

2. A coupling device according to claim 1, wherein said first coupling member includes a substantially horizontal shoe-like part with side walls converging in the normal direction of movement of the tractor, and wherein said second coupling member includes a foot-like part with correspondingly converging side surfaces for insertion into said shoe-like part.

3. A coupling device according to claim 1, wherein said first coupling member includes a substantially horizontal shoe-like part with side walls converging in the normal direction of movement of the tractor, and wherein said second coupling member includes a foot-like part with correspondingly converging side surfaces for insertion into said shoe-like part, and further comprising projecting members at said foot-like part extending substantially horizontally and laterally therefrom, and corresponding apertures provided in the side walls of said shoe like part, said apertures being open toward the rear thereof in a direction opposite to said normal direction of movement to receive said projecting members from the rear thereof during insertion of said foot-like part into said shoe-like part and to thereby prevent lifting of said foot-like part out of said shoe-like part.

4. A coupling device according to claim 1, further comprising a housing rigidly connected with said first coupling member, said coupling sleeve being vertically adjustable in said housing, a substantially rectilinear slot in said housing, actuating means extending through said slot for adjusting said sleeve, a lever, and means for supporting said lever at said first-mentioned coupling member and for connecting said lever with said actuating means to enable rectilinear movement of said sleeve during adjustment thereof by said actuating means.

5. A coupling device for coupling a trailer to a tractor comprising a supporting device at the tractor, an intermediate member, means for rotatably supporting said intermediate member in said supporting device about a vertical axis of rotation, a first coupling member, means for slewably supporting said first coupling member on said intermediate member about a horizontal axis, drive means associated with said first coupling member, a second coupling member, driving means associated with said second coupling member, means in said coupling members for coupling together said drive means, a first housing section rigidly connected with said first coupling member for supporting a part of said first-mentioned drive means, a second housing section rotatable with respect to said first housing section about a vertical axis for supporting another part of said first-mentioned drive means, means for driving said another part by the driving means on the tractor, and means for locking said second housing section with respect to said supporting device to rotate said first coupling member together with said first housing section about the vertical axis during rotation of said intermediate member about said vertical axis, and to prevent rotation of said second housing section during such rotation, both of said housing sections being rotated together during rotation of said first coupling member about said horizontal axis.

6. A coupling device according to claim 5 wherein each of said housing sections is provided with a centering surface, further comprising a centering sleeve between said two housing sections having two cylindrical centering flanges, one of each of said centering flanges co-operating with one of said centering surfaces, and bearing means between one of said housing sections and said centering sleeve for axially mounting and rotatably supporting said two sections with respect to each other.

7. A coupling device according to claim 5 wherein said locking means comprises a U-shaped rail at said second housing section substantially proceeding vertically, and a plate engaging said U-shaped rail, said plate being secured to said supporting device.

References Cited in the file of this patent

UNITED STATES PATENTS

| 1,261,261 | Menhall et al. | Apr. 2, 1918 |
| 2,072,728 | Cederstrom | Mar. 2, 1937 |
| 2,178,841 | Lubbers | Nov. 7, 1939 |
| 2,421,044 | Vutz | May 27, 1947 |
| 2,441,293 | Seyferth | May 11, 1948 |